Figure 1:
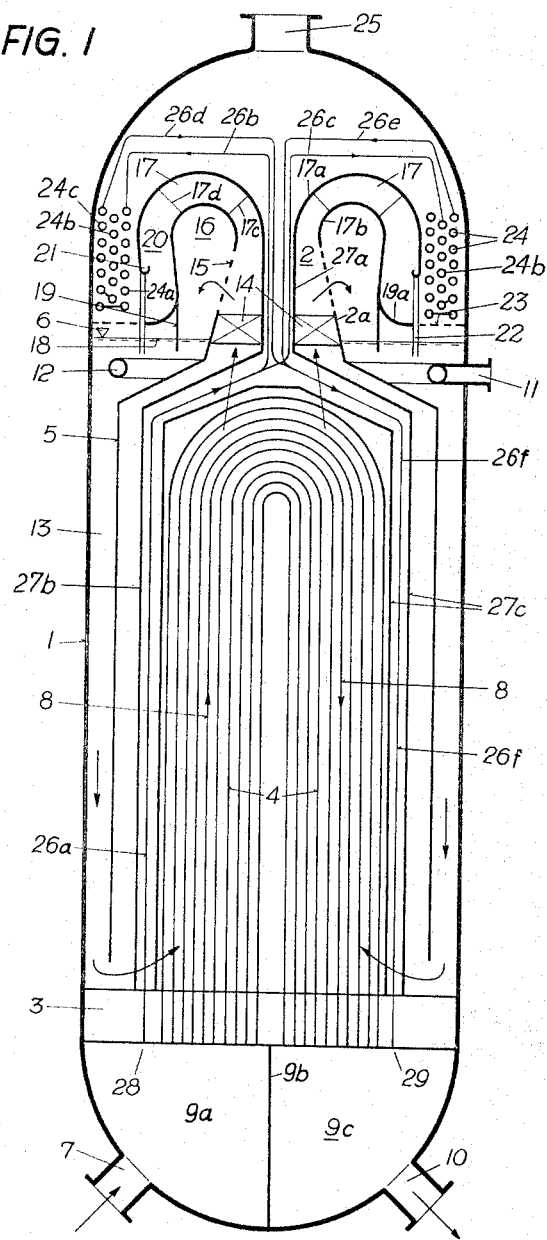

July 4, 1967  A. SANDRI  3,329,129
PROCESS AND APPARATUS FOR GENERATING STEAM
Filed Oct. 30, 1964  2 Sheets-Sheet 2
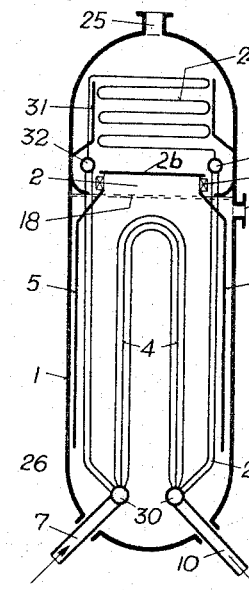
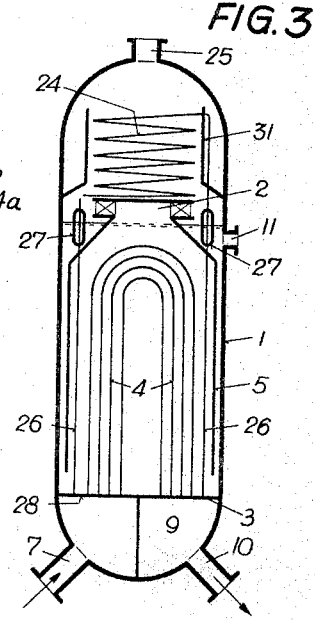
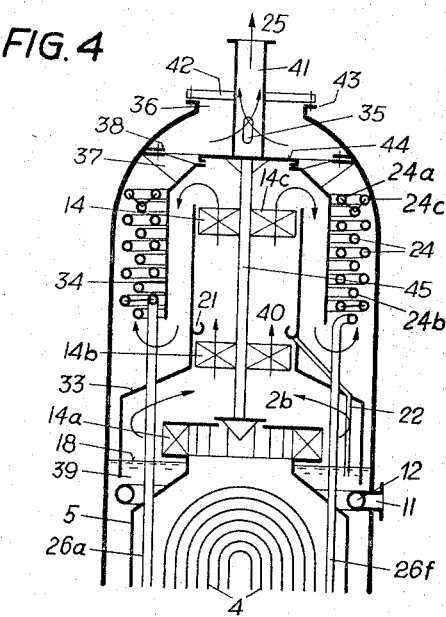

United States Patent Office 3,329,129
Patented July 4, 1967

3,329,129
PROCESS AND APPARATUS FOR GENERATING STEAM
Alfred Sandri, Graz, Austria, assignor to Waagner-Biro Aktiengesellschaft, Vienna, Austria
Filed Oct. 30, 1964, Ser. No. 407,922
Claims priority, application Austria, Oct. 31, 1963, A 8,764/63
11 Claims. (Cl. 122—34)

The present invention relates to a process and apparatus for generating steam which is in dry form and which may also be superheated. A process and apparatus of this type can be used for pressure or hot water reactors, and in fact the structure of the invention can be used in general for heat exchanges of all types such as conventional boilers, heat exchangers which form parts of reactor assemblies in atomic energy plants, and the like.

In known steam generators of the above type it is essential to use an extremely large amount of complicated structure in order to achieve a dry steam, particularly with reactors. Moreover, in spite of all of the complications and costly structure involved in conventional boilers of this type, it is still not possible to provide a steam which has a moisture content of less than 0.2%.

It is therefore a primary object of the present invention to provide a process and apparatus capable of generating dry steam in a manner simpler than has heretofore been possible.

Also, it is an object of the present invention to provide a process and apparatus capable of producing a dry steam whose moisture content is less than 0.2%.

With the above objects in view the invention includes, in a process for generating steam, the steps of heating a liquid to convert the latter into the form of a gas having liquid particles suspended therein, centrifugally separating the liquid particles from the gas so as to dry the latter at least partially, and then further heating the gas so as to complete the drying thereof.

Also, with the above objects in view, the invention includes, in a boiler, a fluid guide means for guiding a fluid along a given path while the fluid changes from liquid form to the form of a gas having liquid particles suspended therein and then into the form of a dry gas, this boiler of the invention including a first heating means which changes the fluid from liquid form into the form of a gas having liquid particles suspended therein, a separator means located along the path of fluid flow subsequent to the first heating means to mechanically separate the liquid particles from the gas, and finally a second heating means located along the path of fluid flow subsequent to the separator means for receiving the gas therefrom and for further heating the gas to complete the drying thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal elevation of one possible embodiment of a structure according to the present invention, the apparatus being shown schematically in FIG. 1; and FIGS. 2–4 respectively illustrate schematically different embodiments according to the invention.

Referring now to FIG. 1, the outer casing 1 of a boiler is illustrated, this boiler casing 1 being capable of withstanding considerable pressure in the interior of the boiler. Near the top of the boiler casing or housing 1 is situated a separator means 2 for mechanically separating liquid particles or droplets from a gas in which the liquid particles are suspended. Near the bottom of the boiler housing 1 is a transverse wall 3 fixedly carried by the housing 1 and extending completely across the latter and a first heating means 4 is carried by the wall 3 for heating fluid which is guided through the interior of the boiler housing 1 along a predetermined path by a fluid-guide means described below. The first heating means 4 is composed of a plurality of elongated tubes which are of U-shaped configuration and the ends of which extend through the transverse wall 3 so that the open ends of the tubes communicate with the space beneath the wall 3, as viewed in FIG. 1.

An elongated substantially bell-shaped fluid guide member 5 forms part of the fluid guide means and is situated in the interior of the boiler housing 1. The fluid guide member 5 is of a generally cylindrical configuration and the boiler housing 1 is also of a generally cylindrical configuration, and the fluid guide member 5 is situated coaxially within the housing 1 to define with the latter the elongated cylindrical space 13 along which the fluid is guided in a manner described below. The fluid guide member 5 is supported in any suitable way within the housing 1 so that the bottom edge of the fluid guide member 5 is spaced somewhat above the transverse wall 3, as indicated in FIG. 1. Any suitable struts or the like may extend between and be fixed to the inner surface of the wall 1 and the outer surface of the fluid guide member 5 to support the latter at the elevation illustrated in FIG. 1, and it will be noted that at its top end the fluid guide member 5 is of a frusto-conical configuration with its diameter becoming sharply smaller as its elevation increases, and the open top end of the fluid guide member 5 leads directly into the separator means 2 which is also described in greater detail below.

The interior of the boiler housing 1 is filled with liquid such as water up to the level 6 indicated diagrammatically in FIG. 1, and this body of liquid rests on the transverse wall 3 which is fluid-tightly connected with the inner surface of the casing 1 and with the exterior surface of the tubes of the first heating means 4, so that the liquid is reliably maintained above the wall 3 in the boiler housing 1. The liquid which surrounds the tubes of the first heating means 4 is heated by heat exchange with a heating medium which flows through the tubes of the first heating means 4. This heating medium enters into the bottom end of the boiler housing 1 at one side thereof into a chamber beneath the wall 3 through an inlet 7, and it is to be noted that beneath the wall 3 the interior of the casing 1 is divided into a pair of chambers 9a and 9c by a partition 9b situated between the ends of the U-shaped tubes of the heating means 4. Thus, the heating medium in the form of any suitable hot gases derived from any suitable source flows through the inlet 7 into the chamber 9a and from the latter into the tubes of the heating means 4 to flow through these tubes into the chamber 9c on the outside of the partition 9b, and then the heating medium discharges from the chamber 9c through the outlet 10 at a temperature which is, of course, substantially lower than the temperature of the heat fluid entering through the inlet 7. The liquid at the exterior of the tubes of the heating means 4 is therefore heated and converted from liquid form into a gaseous form in which liquid particles or droplets are suspended, and the heating medium flows through the tubes 4 in the direction of the arrows 8.

The liquid which is to be heated enters into the boiler housing 1 through an inlet pipe 11 which communicates with an annular pipe 12 supported in the interior of the housing 1 at an elevation somewhat below the liquid level 6, and the annular pipe 12 is formed with suitable openings through which the liquid streams first downwardly through the cylindrical space 13 and then around the bottom edge of the fluid guide member 5 and upwardly along the interior thereof in contact with the tubes of the heating means 4. Thus, the fluid guide member 5 together with the housing 1 and the wall 3 define a predetermined path along which the fluid which is to be heated is guided, and the first heating means 4 is, of course, situated along this path to heat the fluid so as to convert it from liquid form into the gaseous form in which liquid particles are suspended. Thus, the liquid flows upwardly along the heating means 4 and is in part converted simultaneously into steam in which liquid particles are suspended, and in this latter form the fluid enters into the separator means 2.

This separator means 2 acts as a centrifugal separator and has an outer wall which converges in the direction of fluid flow upwardly from the top end of the fluid guide member 5, the open bottom end of the separator 2 communicating with the open top end of the fluid guide 5. A pipe 27a extends axially and centrally through the separator 2, and a plurality of blades or vanes 14 are fixed to the exterior of the pipe 27a and extend from the latter to the inner surface of the frustoconical outer wall of the separator 2, this outer wall extending upwardly from and forming an extension of the guide member 5, and described below. Each of the blades or vanes 14 forms part of a spiral so that the fluid in the form of a gas having liquid particles suspended therein has a whirling motion induced therein by upward movement past the blades 14, and as a result of this whirling motion the liquid particles are centrifugally thrown against the inner surface of the wall 2a of the separator means 2. In constructions of this type the liquid portion of gas and liquid particles is several times the weight of the gaseous portion thereof, and this liquid portion is centrifugally separated from the gaseous portion by the separator means 2. The centrifugally separated liquid is thrown against perforations 15 formed in the wall 2a so that in this way the liquid reaches the space 16 which surrounds the wall 2a, while the steam which is for the most part free of liquid continues to flow upwardly through the separator 2.

The separator means 2 includes an upper annular wall 17a of inverted U-shaped cross section, and the central tubular portion of the wall 17a is fixed to and forms an extension of the pipe 27a. The separator means 2 also includes a lower annular wall 17b of inverted U-shaped cross section which is fixed to and forms an extension of the wall 2a, and between these annular walls 17a and 17b the separator includes a plurality of radially extending blades 17 which guide the gas from which the liquid has been centrifugally separated radially away from the axis of the housing 1 and then downwardly into the annular chamber 20 which is located immediately subsequent to the blades 17 which guide the gas. Each of the blades 17 has an end 17c which if first engaged by the gas and an end 17d which forms the last part of each blade 17 engaged by the gas flowing through the separator, and inasmuch as there can be a pressure differential between the end edges 17c and 17d of the blades 17, the space 16 which surrounds the wall 2a is closed off by an outer anular wall 19 which forms an extension of the annular channel 17b, extending downwardly from the outer edge thereof to an elevation beneath the liquid level 6, so that in this way the space 16 is closed off from the annular chamber 20 which the gas reaches after flowing past the radial guide blades 17. These guide blades 17 also extend along spirals and thus reintroduce into the gas whirling motion which might have been lost during flowing of the gas from the blades 14 to the blades 17. Therefore the gas is whirling as it flows into and downwardly through the annular space 20, and any additional liquid suspended in the gas is again centrifugally thrown outwardly in the chamber 20 so that liquid particles or droplets which still remain in the gas are collected in a gutter 21 of annular configuration situated at the bottom end of the inner wall 17a of the separator means 2. The gutter 21 communicates through a plurality of tubes 22 with the liquid, and the bottom ends of the tubes 22 are also situated beneath the liquid level 6. A flat wall 19a of annular configuration surrounds the tubular wall 19 and has an inner upwardly directed annular portion fixed to the exterior surface of the tubular wall 19, and this flat wall 19a is situated above the liquid level 6 and formed with apertures 23, so that any liquid on the wall 19a can drop through the openings 23 to the body of liquid beneath the wall 19a while at the same time the wall 19a maintains the steam separate from the liquid so as to reliably avoid any undesirable foaming.

Thus, in the manner described above the fluid guide means formed by the housing 1, the fluid guide member 5 and the wall 3 guides the fluid first past the heating means 4 and then through the separator means 2 in which the gas is dried almost completely, and after flowing around the gutter 21 the stream of steam is guided by the outer wall of the housing 1 upwardly through a second heating means 24 which completes the drying of the steam. The second heating means 24 is in the form of an annular body of tubes spaced from each other. Thus, the heating means 24 includes an inner tubular coil 24a, an intermediate tubular coil 24b, and an outer tubular coil 24c. It will be noted that while the convolutions of the inner and outer coils 24a and 24c are at approximately the same elevations, respectively, the convolutions of the intermediate coil 24b are staggered with respect to the convolutions of the inner and outer tubular coils. The heating medium which flows through the second heating means 24 is the very same heating medium which flows through the tubes of the first heating means 4, so that with the structure of the invention both heating means are supplied from a common source of heat. The heat for the second heating means 24 is delivered to the latter through a conduit 26a which has a bottom open end 28 extending fluid-tightly through the wall 3 and communicating with the chamber 9a. The heating fluid flows from the chamber 9a and through the inlet 28 into the pipe 26a and upwardly along the latter to the branches 26b and 26c of the pipe 26a. The branch 26b communicates with the uppermost convolution of the inner coil 24a of the heating means 24 while the branch 26c leads to the uppermost convolution of the intermediate coil 24b, so that in this way the heating medium is simultaneously delivered to the inner and intermediate coils of the heating means 24. The lowermost convolution of the inner coil 24a communicates with the lowermost convolution of the outer coil 24c, as shown diagrammatically in FIG. 1, while the lowermost convolution of the intermediate coil 24b communicates with the next to the lowest convolution of the outer coil 24c, so that the heating medium which flows downwardly through the intermediate and inner coils of the second heating means 24 flows upwardly through the outermost coil 24c, and a pair of branches 26d and 26e of a return flow conduit 26f communicate with the uppermost convolution of the outer coil 24c to receive the heating medium therefrom and to direct it downwardly through the return flow conduit 26f into the chamber 9c, the conduit 26f also extending fluid-tightly through the wall 3 and having an open discharge end 29 communicating directly with the chamber 9c from which the heating medium discharges through the outlet 10.

It is to be noted that all of the branches 26b–26e extend upwardly through the pipe 27a which extends centrally and axially through the separator means 2, so that this pipe 27a serves to maintain the branches 26b–26e, which carry the heating medium for the second heating means 24, separate and insulated from the fluid within the separator means 2. The pipe 27a branches into a pair of pipe extensions 27b and 27c in which the conduits 26a and 26f are respectively housed, so that these branches 27b and 27c which extend downwardly through the liquid maintain the conduits 26a and 26f separate and insulated from the liquid which is heated by the first heating means 4. The bottom ends of the branches 27b and 27c are of course fluid-tightly connected with the wall 3. Therefore, with the structure of the invention the conduits which provide for flow of the heating medium to and from the second heating means 24 are maintained at all times out of engagement with the liquid which is to be converted into steam, and in this way variations in the temperature of the conduits leading the heating medium to and from the second heating means 24 is maintained at a minimum. If the liquid which is to be converted to steam were directly in engagement with the conduits which lead the heating medium to and from the second heating means 24, there would be, particularly in the region of the liquid level 6 whose elevation continuously changes within a certain range, a considerable variation in the temperature of these conduits leading the heating medium to and from the heating means 24, so that these conduits would be subjected to considerable stresses and very likely failure of the conduits would result were it not for the pipes 27a–27c which separate the conduits 26a and 26f from the liquid.

Thus, with the structure of the invention the moist steam which flows past the edges 17d of the blades 17 is dried to a considerable extent in the space 20 and the drying of the steam is completed by the second heating means 24 which in addition may provide a slight superheating of the steam, so that just before the steam issues through the upper outlet 25 of the boiler housing 1, the steam is thoroughly dried and even slightly superheated and issues in this latter condition from the structure of the invention.

The separator means 2 separates almost all of the liquid from the gas with an exceedingly simple mechanical structure. Any minute liquid particles which are still carried by the gas beyond the separator means 2 will necessarily engage the exterior surfaces of the coils of the heating means 24, so that in this way a thoroughly dried steam is provided, and the staggered or offset positioning of the coils of the heating means 24 provides a very reliable heating of all parts of the gaseous stream. Furthermore, this staggered arrangement of the coils provides an improved heat exchange. Any salt deposits which begin to accumulate on the exterior surfaces of the heating means 24 can be separated therefrom from time to time by spraying these exterior surfaces with a water which has a low salt content.

In the embodiment of the invention which is illustrated in FIG. 2, the parts which correspond to those of FIG. 1 have the same reference characters. In the embodiment of FIG. 2 a pair of separate collecting chambers 30 are situated within the boiler housing 1 and respectively communicate with the inlet and outlet pipes 7 and 10 for the heating medium which in this case also flows through the U-shaped tubes of the first heating means 4, these tubes directly communicating with the chambers 30 as shown schematically in FIG. 2. Liquid introduced through the inlet 11 is maintained so that its surface 18 is at the elevation illustrated, and it will be noted that in FIG. 1 the liquid surface 18 has the liquid level 6 referred to above. Just over the surface 18 of the liquid is situated the separator means 2 which in this embodiment has a construction even simpler than that of FIG. 1. With the embodiment of FIG. 2 the separator means 2 includes a plurality of blades 14a fixed to the annular top edge of the fluid guide member 5 and distributed thereabout so that steam forming above the liquid surface 18 together with liquid particles suspended therein are compelled by the radial vanes or blades 14a to flow radially toward the wall of the boiler housing 1, and the blades 14a have a spiral configuration inducing a whirling motion in the mixture of gas and liquid particles as they flow downwardly beyond the blades 14a. The separator means 2 of FIG. 2 includes a transverse wall 2b situated directly over the blades 14a and closing off the space over the liquid surface 18 and surrounded by the blades 14a, so that the steam and liquid droplets must flow radially through the blades 14a. The inner surface of the boiler housing 1 carries a second guide means 31 the inner lower surface of which is engaged by the whirling liquid droplets so that they are separated at the surface of the guide 31 from the gas and form on the inner surface of the guide 31 a film of liquid flowing back down to the body of liquid surrounding the fluid guide 5 and the pipes of the heating means 4. The gas from which the liquid particles have in this way been separated for the most part flows upwardly through the second heating means 24 which in this case is in the form of a simple zig-zag arrangement of tubes communicating with chambers 32 which in turn communicate with conduits 26 which communicate at their lower ends with the chambers 30. Thus, the heating medium delivered to the left chamber 30 of FIG. 2 will flow not only through the first heating means 4 but also through the conduit 26 at the left of FIG. 2 upwardly to the left chamber 32, from the latter through the second heating means 24 to return to the right chamber 32 of FIG. 2 from where the heating medium returns through the right conduit 26 to the right chamber 30 and the discharge 10 for the heating fluid. The fluid guide 31 of course compels the steam from which the liquid has been mechanically separated to flow upwardly through the heating means 24 which completes the drying of the steam and even superheats the same to some extent before the thoroughly dried steam issues through the outlet 25 of the boiler. The tubes which form the heating means 24 have in the embodiment of FIG. 2 a smaller diameter than the tubes of the heating means 4. In the embodiment of FIG. 2 the conduits 26 are not insulated from the liquid which is converted into steam, and for this reason these conduits 26 of FIG. 2 have a relatively large diameter.

In the embodiment of FIG. 3 the parts which correspond to the embodiments of FIGS. 1 and 2 have the same reference characters. While the conduits 26 of FIG. 3 serve the same function as the conduits 26 of FIG. 2, these conduits 26 of FIG. 3 are surrounded at their portions which extend through the surface of the liquid with pipes 27 which maintain these portions of the conduits 26 separate from the liquid, and the length and elevation of the insulating pipes 27 is such that they extend throughout the possible range of variation in the elevation of the liquid surface, so that at this range the conduits 26 are protected from the liquid and from the sharp temperature fluctuations which are encountered at this particular area. The conduits 26 of course communicate directly with the second heating means 24 of FIG. 3 which in this case also is surrounded by the fluid guide member 31. In the embodiment of FIG. 3 the conduits 26 as well as the pipes of the first heating means 4 are again carried by a transverse wall 3 which provides at the lower part of the embodiment of FIG. 3 the same structure as FIG. 1. Because a substantial flow of heating medium through the second heating means 24 is desired with the embodiment of FIG. 3, in spite of the relatively long length of the conduits 26 and the pipes which form the heating means 24, these pipes 26 are provided with a diameter greater than that of the tubes which form the heating means 4. The separator means 2 of FIG. 3 is identical with that of FIG. 2.

In the embodiment of FIG. 4 the parts are shown again with the same reference characters as those used for corresponding parts in the other embodiments. The lower part of the boiler of FIG. 4, which is not illustrated in FIG. 4, may have the same structure as shown in FIG. 1 except that the pipes 26a and 26f are not insulated from the liquid by pipes 27b and 27c, respectively. With this embodiment the liquid introduced through the inlet 11 and the annular pipe 12 has also the level 18 and is guided by the fluid guide member 5 in the manner described above in connection with FIG. 1 so that the liquid is heated by the first heating means 4 before reaching the separator means of FIG. 4. This separator means includes a first portion substantially identical with the separator means of FIGS. 2 and 3. Thus, this first portion of the separator means includes blades 14a and a wall 2b which compels the gas and liquid particles therein to flow radially through the spirally shaped blades 14a which induce a whirling motion in the mixture as it flows radially beyond the blades 14a, and an upper guide member 33 has its bottom annular edge extending beneath the liquid surface 18 so that the liquid droplets which centrifugally impinge on the inner surface of the lower cylindrical part of the fluid guide member 33 flow back down to the body of liquid. The gas from which the liquid particles have been centrifugally separated by the radial blades 14a now flows upwardly through axial blades 14b of the separator means of FIG. 4, and these blades 14b induce an additional whirling action in the gas to cause any liquid particles therein which have not been separated below the blades 14b to be centrifugally thrown against the upper cylindrical wall portion of the fluid guide 33, so that the gas is further mechanically dried, and the liquid at this part of the sepaartor is received in the gutter 21 which communicates through the pipe 22 with the body of liquid. The gaseous stream which flows in the direction of the arrows 40 upwardly through the separator means has thus had most of the liquid separated therefrom by the lower blades 14a and further separated therefrom by the intermediate blades 14b, and finally this gas flows through upper blades 14c which provide a further whirling to the gas as it flows downwardly through the additional fluid guide 34 which coaxially surrounds and is spaced from the upper cylindrical portion of the fluid guide 33. In this way any small fine liquid particles still remaining in the gas flow downwardly along the inner cylindrical surface of the fluid guide 34 to drop therefrom onto the exterior surface of the frustoconical portion of the fluid guide 33, this frustoconical portion interconnecting the upper and lower cylindrical portions of fluid guide 33 which are respectively of smaller and larger diameter, in the manner shown in FIG. 4. Thus, the fluid guide means of FIG. 4 includes not only the wall 1 of the boiler housing but also the fluid guide members 5, 33 and 34 which guide the fluid in the manner indicated by the arrows in FIG. 4 so that finally the gas from which the liquid has been practically entirely separated flows around the bottom edge of the guide 34 and up through the second heating means 24. It is to be noted that by directing the bottom end of the tube 22 as well as the bottom edge of the fluid guide member 33 into the body of liquid 39 the different chambers through which the fluid flows while being converted from liquid into dry steam will have different static pressures which are maintained with the structure of the invention. In the embodiment of FIG. 4 the heating medium introduced through the conduit 26a communicates with the lowermost convolutions of the inner and outer coils 24a and 24c, at the lowermost parts of these coils, as shown diagrammatically in FIG. 4, and the uppermost convolutions of the inner and outer coils communicate, as shown diagrammatically in FIG. 4, with the uppermost convolution of the intermediate coil 24b, so that in this embodiment the intermediate coil forms the return flow coil through which the heating medium returns to the return flow conduit 24f. Thus, any tiny bits of liquid which are still in the gaseous stream are necessarily dried from the latter by the second heating means 24, and now the thoroughly dried gas, which may be superheated to some extent, flows through the slots 35 of the outlet pipe 41 into the interior thereof to discharge at the outlet 25 of the boiler as shown at the top of FIG. 4. For the purpose of easy assembly of the structure the bell-shaped fluid guide members 33 and 34 of FIG. 4 are preferably composed each of a plurality of easily handled segments which can be readily assembled together in the interior of the boiler. For this purpose the boiler is provided with a manhole 36 through which the components of the structure can be introduced into and removed from the interior of the boiler. The segments of the fluid guide member 34 are fixed by struts, which are fixed to and extend from these segments to brackets 38 fixedly carried by the inner surface of the wall 1 of the boiler. The discharge pipe 41 has a flange 42 fluid-tightly connected with a flange 43 of the wall 1 of the boiler so as to fluid-tightly close the manhole 36. In addition, the pipe 41 has a bottom end closed by a transverse wall 44 to which is fixed an elongated rod 45 extending downwardly along the axis of the boiler into the interior thereof and fixedly carrying in the manner illustrated in FIG. 4 the several sets of guide vanes of the separator means.

Of course, the invention is not limited to the structure described above. The tubes of the heating means 4 can have in their interior a heating medium such as carbon dioxide, for example, which flows through the tubes of the first heating means while being maintained therein at a certain pressure.

It will be understood that each of the elements described above, or two or more together, may also find a useful application in other types of boilers differing from the types described above.

While the invention has been illustrated and described as embodied in steam boilers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a boiler, in combination, an upright pressure vessel; fluid guide means in said pressure vessel for guiding a fluid in liquid form along a first path through a lower portion of said vessel and then in gaseous form along a second path through an upper portion of said vessel; first tubular heating means located along said first path in said lower portion of said vessel for changing the fluid from its liquid to its gaseous form with liquid particles suspended therein; separator means at the junction of said first and said second path for receiving the fluid in gaseous form with liquid particles suspended therein and for mechanically separating the liquid particles from the fluid so as to at least partly dry the gaseous fluid; second tubular heating means having a major portion along said second path in said upper portion of said vessel for receiving the gaseous fluid from said separator means and completely drying said fluid and elongated portions extending along said first path through said lower portion of said vessel and being connected to said major portion in said upper portion of said vessel; connecting means connecting said first tubular heating means and said elongated portions of said second tubular heating means in parallel with each other in the region of the lower end of said upright pressure vessel and communicating with a common source of heat; and insulating means insulating at least part of said elongated portions from said fluid in liquid form and from said fluid in gaseous form with liquid particles suspended therein.

2. In a boiler as recited in claim 1, said fluid in liquid form having a given liquid level where the surface of the liquid is situated, and said insulating means insulating said elongated portions of second heating means from the fluid in liquid and gaseous form with liquid particles suspended therein only in the region of the liquid level.

3. In a boiler as recited in claim 1, said major portion of said second heating means being composed of spirally wound tubes having convolutions some of which are of diameters different from others.

4. In a boiler as recited in claim 3, said convolutions of different diameters being staggered with respect to each other.

5. In a boiler as recited in claim 1, said separator means including a chamber of converging cross section through which the gas and liquid particles suspended therein flow so what they continuously pass through cross sections of gradually reducing size, and spiral blades located in said chamber for inducing a whirling motion in the gas and liquid particles suspended therein so as to centrifugally separate the liquid particles from the gas.

6. In a boiler as recited in claim 1, said separator means centrifugally separating the liquid particles from the gas and including a perforated wall through which the liquid particles pass to be separated from the gas.

7. In a boiler as recited in claim 1, said separator means including a pair of centrifugal separators one of which directs the gas and liquid particles suspended therein radially to provide a coarse separation of the liquid particles from the gas and the other of which receives the gas and liquid particles remaining therein and axially separates the liquid particles from the gas to provide a fine separation.

8. In a boiler as recited in claim 1, the fluid when in liquid form having a predetermined liquid level in the boiler and said second heating means and separator means respectively including a pair of bell-shaped baffles guiding the fluid for movement through said separator means and from the latter through said second heating means, and at least one of said baffles having a lower end portion extending into the liquid beneath the level thereof.

9. In a boiler as recited in claim 1, said fluid-guide means being composed of a plurality of wall portions which are assembled together in the interior of the boiler.

10. In a boiler as recited in claim 1, said elongated portions of said second heating means extending at least in part along said first heating means, and said insulating means extending from said connecting means upwardly at least through said lower portion of said vessel.

11. In a boiler as recited in claim 10, said connecting means including a transverse wall extending through said vessel upwardly spaced from the bottom end thereof and a partition extending between said transverse wall and said bottom end of said vessel, said first tubular heating means comprising upright U-shaped tubes communicating with the space beneath said transverse wall to opposite sides of said partition and said elongated portions of said second heating means being arranged to opposite sides of said U-shaped tubes and respectively communicate with said space to opposite sides of said partition, and including means for feeding a heating fluid into said space to one side of said partition and out of said space from the other side of said partition.

References Cited
UNITED STATES PATENTS

| | | | |
|---|---|---|---|
| 2,594,490 | 4/1952 | Patterson | 55—323 |
| 2,648,397 | 8/1953 | Ravese et al. | 55—343 |
| 3,141,445 | 7/1964 | Bell | 122—34 |
| 3,164,133 | 1/1965 | Pacault et al. | 122—34 |
| 3,209,731 | 10/1965 | Schonberger | 122—34 |

KENNETH W. SPRAGUE, *Primary Examiner.*